United States Patent Office 2,953,429
Patented Sept. 20, 1960

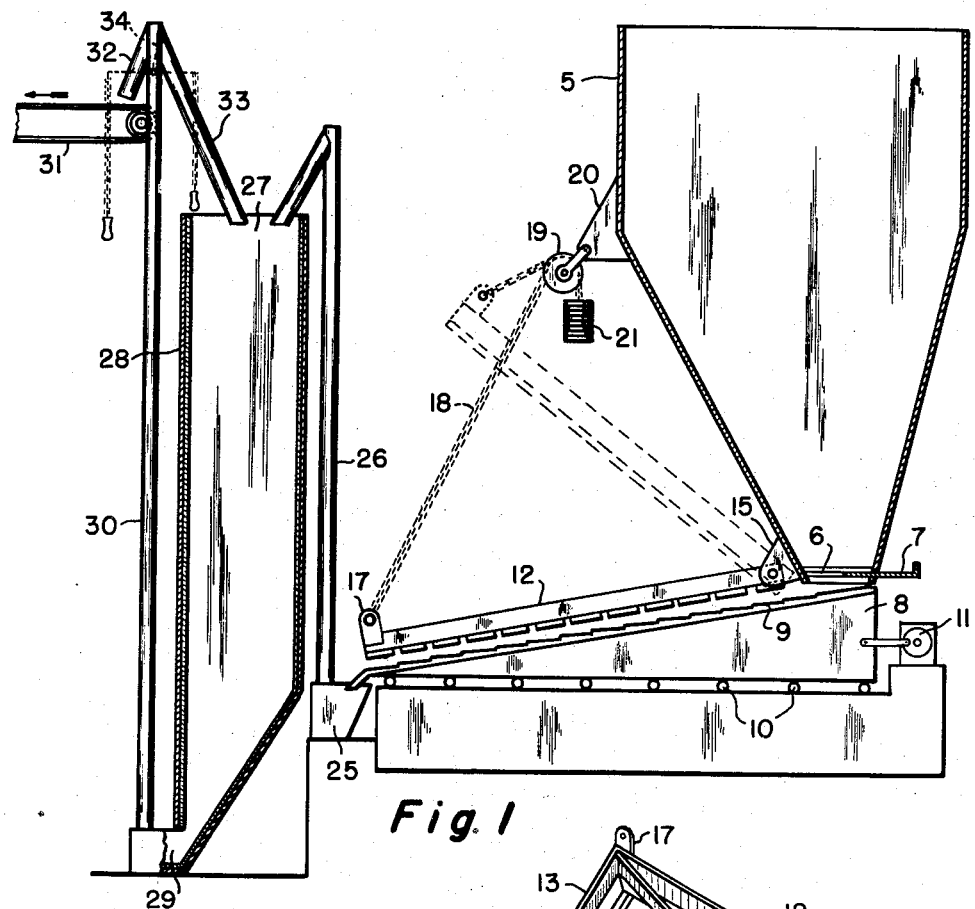
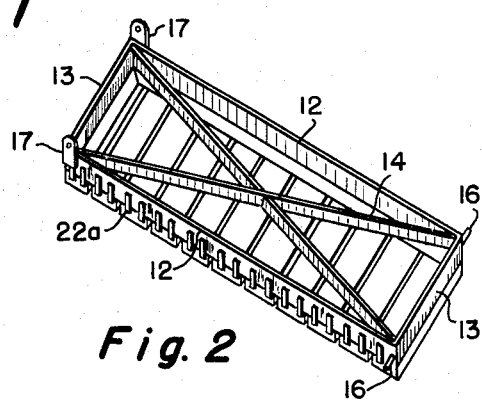
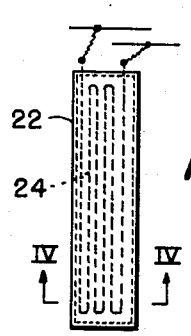
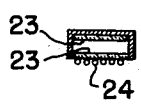
Fig. 1
Fig. 2
Fig. 3
Fig. 4

2,953,429

METHOD FOR STERILIZING GRANULAR FOOD

Albert E. Shiffler, Irwin, Pa., assignor to Best Feeds & Farm Supplies, Inc., Washington, Pa., a corporation of Pennsylvania Filed Feb. 11, 1957, Ser. No. 639,546

4 Claims. (Cl. 21—2)

This invention relates to a method and apparatus for sterilizing granular material.

Losses caused by insects to stored granular material, such as grain and milled products, are tremendous. The best mode of combating such losses is to sterilize the granular material proir to packaging or storing.

A publication by the United States Department of Agriculture entitled "Controlling Insects in Flour Mills," Circular No. 720, describes the various insects which infest grain and similar products and also discusses the mode of avoiding and killing such insects. As stated in this publication, to sterilize granular material, it is necessary to maintain the material at an elevated temperature which is known as the "killing temperature," which varies with the type of insect life contained in the materials and the material being sterilized. This temperature must be maintained for more than five minutes and preferably, ten minutes. It is known that temperatures between 80–120° F. encourage the incubation of bugs, weevils, and eggs and would be of no avial in a sterilization process. The maximum temperature for an extended period of time to which any granular material should be subjected in destroying the infestation therein depends entirely upon the material being sterilized, the subsequent use to which the material is to be put, and the type of infestation present in the material.

One prior method of sterilization consist in placing the granular material on long slow moving conveyors having heating units overhead. The material is heated by the heating units over a long period of time until sterilized. Another known mode of sterilizing granular materials consists in passing the materials through one or more revolving cylinders of considerable length. The material is heated while inside the revolving cylinder for a sufficient period of time to sterlize it. The conveyors and revolving cylinders used in the known sterilization methods require large floor space and large investment in equipment to achieve the desired result. The known methods are also very costly to operate and time consuming.

The present invention avoids the difficulties of these prior methods by producing the same degree of sterilization of the granular materials in very compact apparatus requiring very little floor and building space and only a reasonable investment in equipment. A more uniform sterilization of the materials over a relatively shorter period of time and low production cost is achieved by the present invention as compared to the prior methods.

In the drawings, I have illustrated a preferred embodiment of my invention in which:

Figure 1 is a side view of the apparatus with parts in section for clarity;

Figure 2 is a view of a heater unit;

Figure 3 is a plan view of an individual heater element; and

Figure 4 is a cross section of the heater element taken on line IV—IV of Figure 3.

Briefly, the present invention consists of an apparatus including a hopper, for storing the granular material, having an opening through which the material passes to a reciprocating table having a heater unit overhead. The table is reciprocated to cause the material to pass along its upper surface while being heated to a high temperature by the heater unit. The material leaves the table and is conveyed to an insulated bin in which the heated material is retained for a period of time and at a temperature sufficient to insure destruction of any insect life in the material.

Referring to Figure 1, a large hopper 5 having an open top supplies granular material downward through a bottom opening 6 having a slide gate 7. Granular material from the hopper passes through the opening 6 onto a table 8 having an upper inclined surface 9. The table 8 is mounted on springs or rollers 10 and is reciprocated by a motor and pitman 11. A heater unit consisting of side plates 12 maintained in spaced relationship by end plates 13 and cross braces 14 is above the table 8. The side plates 12 of the heater unit have trunnions 16 welded thereto which revolve in holes in the brackets 15 to swingably mount the unit. The front end of the heater unit has brackets 17 welded thereto and connecting chains or cables 18 extending upwardly and over grooved wheels 19 which are rotatably mounted on brackets 20 welded to the hopper 5. The cable 18 extends around the grooved wheel 19 and has a counterweight 21 affixed to its lower end. In an emergency, the heater unit may be elevated to the dash line position shown in Figure 1 by pulling downwardly on counterweight 21. The grooved wheel 19 and the weight 21 are sufficiently spaced to the sides of the heater unit so that the counterweight does not collide with the heater during the elevation.

The heater unit has heater elements 22 attached along its lower edge in any conventional manner, for example, by bolts and clamps 22a affixed to side plates 12. The heater elements 22 consist of box-like members having open bottoms. Two pieces of asbestos 23 are positioned in each of the box-like members in spaced relationship as shown in Figure 4. Heating rods 24 are affixed to each of the lower asbestos sheets and connected to a source of power. The heating elements are preferably infrared heating units known as "deep infrared heaters" and are capable of maintaining a surface temperature of 1300° F.

The granular material after being heated to a high temperature on the table passes to a small hopper 25 and is then conveyed by an elevator means 26 to the top of an insulated bin 27 where it is deposited and allowed to fall therein. The elevator means 26 is conventional. The bin 27 is insulated. For example, its outer surface 28 may be covered with commercial insulating board. The granular material after being introduced into the bin is allowed to remain therein at a temperature of at least 130° F. for a period of time of 5 to 15 minutes which I have found to be the minimum "killing temperature" for the materials for which my process is primarily designed. The granular material is heated to a sufficient temperature while passing over the table 8 to maintain a temperature of at least 130° while in the bin. The granular material after being retained in the bin for a sufficient period of time passes out through an opening 29 in the bottom of the bin which is opened and closed in any conventional manner. The material then is elevated by a conveyor means 30 to a belt conveyor 31 which takes the granular material to further processing apparatus such as packaging, bagging, or storage. The conveyor 30 is similar in structure to conveyor 26. The top of conveyor 30 has an outlet 32 which directs granular material to the conveyor 31 and an outlet 33 which directs granular material back into the top of the bin 27. A control means and valve 34 is located at the top of the conveyor 30 to direct the granular material either through the outlet 32 or the outlet 33, whichever is desired at the time of operation. The control means and valve 34 can be of any conventional known design to permit the opening of outlet 32 with the simultaneous closing of outlet 33, or vice versa. The purpose of the outlet 33 will be explained hereinafter.

In accordance with the above discussion, it is essential that the granular material be heated to a sufficiently high temperature while on the table surface 9 so that a sufficient quantum of heat will be retained in the materials after passage to bin 27 to create a uniform temperature throughout the material in the bin, at least above the "killing temperature" of any insects contained therein. The bin 27 is thoroughly insulated to insure maintenance of the "killing temperature" therein. The "killing temperature" is normally above 130° F. Greater heating temperatures may be used while the material is passing over the table 8 up to the point of toasting the material if it is desired to maintain higher temperatures in bin 27. Thus, a higher temperature for a lesser period of time in the bin may function properly if the food value in the material being processed is not destroyed; for example, in wheat, flour, and feeds which contain vitamins, it is known that high temperatures over long periods of time are detrimental to the baking qualities of the flour as the starches are partially converted to sugars and the vitamin content is lowered. Thus, the temperature to which the material is heated initially is dependent somewhat upon the subsequent use to which the material will be put.

Preferably the table 8 has a sloping stepped configuration on its upper surface which the material traverses from the hopper 5 to the hopper 25. The stepped relationship on the table surface results in the material being moved and tumbled while passing over the table. It is essential that the material be tumbled to uniformly heat the material and avoid toasting which would result if the material only presented one of its sides during its traverse over the table.

The motor and pitman 11 are of variable speed to control the time required for the material to be moved over the table. The material may move over the table in as short a period as one-half minute. Normally, the material is about one inch thick on the table and about 8,000 pounds traverse the table per hour.

The bin 27 is of sufficient size to hold a large amount of production and when the bin is completely full, the rate of flow into the top of the bin from the conveyor 26 equals the rate of flow of the material out of the bin through the opening 29 while allowing for a fifteen minute holding period of the material within the bin at a temperature of 140–150° F.

When it is desired to start the process and the bin 27 is empty, it is necessary to heat the inside walls of the bin to insure adequate sterilization. The granular material is started across the table 8 into the hopper 25 to be elevated by the conveyor 26 into the bin. After the heated material falls into the bin, the opening 29 is opened and conveyor 30 elevates the material to outlet 33 to permit it to fall back into the bin. The processing of the granular material is continued across the table 8 simultaneously with the heated material in the bin being withdrawn through the opening 29 and elevated by the conveyor 30. Thus the hot material being delivered by the conveyor 26 and partially cooled material being delivered by the opening 33 are intermixed and the inside walls of the bin are heated to a temperature sufficient to complete sterilization of the material which was initailly flowed into the bin.

If the process is started with the bin 27 containing some material from the previous day's production, the hot material is delivered by the conveyor 26 to the top of the bin simultaneously with the conveyor 30 withdrawing material from the opening 29 at the bottom of the bin and delivering it through the outlet 33 into the top of the bin. Thus, the material which was retained in the bin from the previous day is reheated and resterilized to insure proper processing.

*Example*

Granular material was fed from hopper 5 onto table surface 9 at the rate of 8,000 pounds per hour. The table surface 9 was 16 feet long by 4 feet wide and had a sloped stepped surface which dropped 32 inches in the 16 feet length. The heater unit was 13 feet 6 inches long and 4 feet wide. There were 12 "deep infrared heater" elements on the heater unit. The material was heated and passed to an insulated bin 27 where it was retained for 15 minutes at 140–150° F. The bin 27 could hold 50 minutes of production. The sterilized material was then packaged.

The present apparatus and method can be used to treat the following materials: corn flakes, mixed dry dog food, corn kibble expanded, bread crumbs, bakery products, soybean meal and pellets, cereals, whole grains (corn, oats, wheat), meat scraps, fish meal, corn meal, ground or processed cereals, seeds for feeding, coffee, tea, spices, and herbs, for example.

While I have described a present preferred embodiment of my invention, it is to be understood that it may be otherwise embodied within the scope of the following claims.

I claim:

1. A method of uniformly heating and sterilizing organic granular material for consumption by humans and animals, said heating destroying infestation in the granular materials; which comprises rapidly heating the granular material to a temperature greater than 130° F. but less than the toasting temperature of the materials; said granular material being heated while in a thin, turbulent layer; immediately moving the heated materials away from the heating area with a minimum loss of heat to a heat insulated receptacle; maintaining the heated materials in said receptacle in a unitary mass and non-turbulent, heat insulated state and in the absence of additional heat for about 5–15 minutes at a temperature greater than 130° F. to destroy infestation in the heated materials; said mass and said state permitting a transfer of heat among the heated materials to effect a substantially uniform temperature throughout the mass of heated materials; and periodically removing some of the sterilized materials from the receptacle as additional heated materials are supplied to the receptacle.

2. A method according to claim 1 wherein said materials are retained in the receptacle between about 140° F. and 150° F. for a period of 15 minutes.

3. A method according to claim 1 wherein said heated materials are introduced into the receptacle through its top, and materials are removed from said receptacle through its bottom; the heated materials being maintained in said unitary mass and non-turbulent state between the top and bottom of the receptacle.

4. A method according to claim 1 wherein said heated materials are deposited in the top of said receptacle and withdrawn from the bottom of said receptacle; the unitary mass of said materials in the receptacle moving slowly from top to bottom in the receptacle.

References Cited in the file of this patent

UNITED STATES PATENTS

| | | |
|---|---|---|
| 2,015,388 | Thomas | Sept. 24, 1935 |
| 2,114,494 | Hummel | Apr. 19, 1938 |
| 2,267,718 | Campbell et al. | Dec. 30, 1941 |
| 2,428,090 | Haeher | Sept. 30, 1947 |
| 2,571,271 | Marks | Oct. 16, 1951 |
| 2,637,624 | Klink | May 5, 1953 |
| 2,729,864 | Klink | Jan. 10, 1956 |